United States Patent [19]

Reiff et al.

[11] 4,440,901

[45] Apr. 3, 1984

[54] PROCESS FOR THE PRODUCTION OF PLASTIC BASED ON POLYISOCYANATES

[75] Inventors: Helmut Reiff; Dieter Dieterich, both of Leverkusen, Fed. Rep. of Germany

[73] Assignee: Baker Aktiengesellschaft, Leverkusen, Fed. Rep. of Germany

[21] Appl. No.: 509,910

[22] Filed: Jul. 1, 1983

[30] Foreign Application Priority Data

Jul. 20, 1982 [DE] Fed. Rep. of Germany ....... 3227017

[51] Int. Cl.³ ............................................ C08G 18/10
[52] U.S. Cl. .................... 524/591; 524/839; 524/840; 528/49; 528/59; 528/60; 528/61; 528/64
[58] Field of Search ................... 524/591, 839, 840; 528/49, 59, 60, 61, 64

[56] References Cited

U.S. PATENT DOCUMENTS

| 3,965,051 | 6/1976 | Markusch et al. | 524/840 |
| 4,172,191 | 6/1978 | Nachtkamp et al. | 528/61 |
| 4,264,486 | 4/1981 | McLaughlin | 528/64 |
| 4,387,181 | 6/1983 | Brown et al. | 524/840 |

FOREIGN PATENT DOCUMENTS 1281180 7/1972 United Kingdom .

OTHER PUBLICATIONS

K. B. Onder et al., Polym. Prep. Amer. Chem. Soc. Div. Polym. Chem., 21, (1980), 132 ff.

Primary Examiner—Maurice J. Welsh
Attorney, Agent, or Firm—Gene Harsh; Joseph C. Gil; Thomas W. Roy

[57] ABSTRACT

The present invention is directed to a process for the production of plastics based on an isocyanate-polyaddition product by
(1) forming an isocyanate group-containing prepolymer from
 (a) a compound which has a molecular weight of from 146 to about 10,000, is substantially free from hydroxyl groups, contains at least two terminal carboxyl groups and optionally contains ether and/or ester groups,
 (b) excess quantities of an organic nonaromatic polyisocyanate which has at least one cyclohexane ring and exclusively contains aliphatically- and/or cycloaliphatically-bound isocyanate groups and
 (c) up to 10 equivalent percent, based on the isocyanate-reactive groups in component (a), of a compound which is monofunctional for the purposes of the isocyanate-addition reaction and,
(2) reacting the product of step (1) with
 (d) a chain-lengthening agent such as water, a polyamine containing at least two primary and/or secondary amino groups or hydrazine or a derivative thereof containing at least two primary and/or secondary amino groups.

13 Claims, No Drawings

PROCESS FOR THE PRODUCTION OF PLASTIC BASED ON POLYISOCYANATES

BACKGROUND OF THE INVENTION

1. Field of the Invention

This invention relates to the production of plastics, which are substantially free from urethane groups and which are based on polyisocyanates, by the reaction of aliphatic or cycloaliphatic polyisocyanates with compounds which are substantially free from hydroxyl groups and urethane groups and which have isocyanate-reactive groups, to produce the corresponding isocyanate group-containing prepolymers and subsequently chain-lengthening these prepolymers with water, polyamines or hydrazines.

2. Description of the Prior Art

The reaction between carboxyl groups and isocyanate groups which is known in principle and results in amide groups has until now not been used on a large scale for the production of plastics based on polyisocyanates, apart from the production of high molecular weight thermoplastic copolyamides (see, for example K. B. Onder et al., Polym. Prep. Amer. Chem. Soc. Div. Polym. Chem., 21, (1980), 132 ff). The reason for this may be seen in the low reactivity of carboxyl groups towards isocyanate groups, which results in the finding that, during the reaction of compounds containing carboxyl groups with polyisocyanates, secondary reactions always take place which result in an undesirable swelling of the reaction mixtures. Thus, for example during the reaction of the melt of polyesters containing carboxyl groups with conventional polyisocyanates, for example toluylene diisocyanate, highly cross-linked and completely insoluble products are obtained long before the release of carbon dioxide which would theoretically be expected.

On the other hand, amide groups are more thermostable than urethane groups, so that it was possible to proceed from the fact that plastics which were produced using reaction components containing carboxyl groups and were based on polyisocyanates have an increased stability to temperature influences, compared to conventional polyurethanes. Thus, an object of the present invention is to provide a method of producing such polyisocyanate-based plastics which allows the production thereof in a substantially by-product-free form.

Surprisingly, this object may be achieved by the process according to the present invention which is described in more detail in the following.

SUMMARY OF THE INVENTION

The present invention is directed to a process for the production of plastics based on an isocyanatepolyaddition product by (1) forming an isocyanate group-containing prepolymer from
  (a) a compound which has a molecular weight of from 146 to about 10,000, is substantially free from hydroxyl groups, contains at least two terminal carboxyl groups and optionally contains ether and/or ester groups,
  (b) excess quantities of an organic nonaromatic polyisocyanate which has at least one cyclohexane ring and exclusively contains aliphatically- and/or cycloaliphatically-bound isocyanate groups and
  (c) up to 10 equivalent percent, based on the isocyanate-reactive groups in component (a), of a compound which is monofunctional for the purpose of the isocyanate-addition reaction and (2) reacting the product of step (1) with
  (d) a chain-lengthening agent such as water, a polyamine containing at least two primary and/or secondary amino groups or hydrazine or a derivative thereof containing at least two primary and/or secondary amino groups.

DETAILED DESCRIPTION OF THE INVENTION

Component (a) which is to be used in the present process is selected from organic compounds having an (average) molecular weight (which may be calculated from the content of terminal groups) of from 146 to about 10,000, preferably from about 500 to 4,000, most preferably from about 1000 to 3500, which are substantially free from hydroxyl groups, optionally contain ether and/or ester groups, are optionally present as a mixture and which contains at least 2, preferably 2 or 3, most preferably 2, terminal carboxyl groups. The term "free from hydroxyl groups" means in this connection that in these compounds there is a maximum of 10, preferably a maximum of 5, hydroxyl groups per 100 carboxyl groups.

The compounds which are suitable as component (a) are preferably either free polycarboxylic acids having a molecular weight of at least 146 of the type exemplified below as components for the production of polyesters containing carboxyl groups, or are polyesters, polyethers, polyacetals or polyamines which contain terminal carboxyl groups. Polyesters or polyether containing terminal carboxyl groups are preferably used as component (a). Of course, mixtures of different compounds corresponding to the definition mentioned above may also be used in the present process.

Polyesters containing carboxyl groups are, for example the known reaction products of polyhydric, preferably dihydric, and optionally also trihydric alcohols with polybasic, preferably dibasic, carboxylic acids. Instead of the free polycarboxylic acids, the corresponding polycarboxylic acid anhydrides or corresponding polycarboxylic acid esters of lower alcohols or mixtures thereof may also be used for the production of the polyesters containing terminal carboxyl groups. The polycarboxylic acids may be of an aliphatic, a cycloaliphatic, an aromatic and/or a heterocyclic nature and may optionally be substituted, for example by halogen atoms, and/or may be unsaturated. The following are mentioned as examples of such acids: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene-tetraphthalic acid anhydride, glutaric acid anhyride, maleic acid, maleic acid anhyride, fumaric acid, dimeric and trimeric fatty acids, such as oleic acid, optionally in admixture with monomeric fatty acids, terephthalic acid dimethyl ester and terephthalic acid bis-glycol ester. The following, for example are included as polyhydric alcohols: ethylene glycol, propylene glycol-(1,2) and -(1,3), butylene glycol-(1,4), -(1,3) and -(2,3), hexane diol-(1,6), octane diol-(1,8), neopentyl glycol, cyclohexane dimethanol (1,4- bis-hydroxymethyl-cyclohexane), 2-methyl-1,3-propane diol, glycerin, trimethylolpropane, hexane triol-(1,2,6), butane triol-(1,2,4), trimethylolethane, pentaerythritol, quinitol, mannitol, sorbitol, methyl glycoside, also diethylene glycol, triethylene glycol, tetraethylene glycol, polyethylene glycols, dipropylene glycol, polypropylene glycols, dibutylene glycol and polybutylene glycols.

Suitable polyethers containing terminal carboxyl groups may be obtained, for example by reacting polyether polyols which are known from polyurethane chemistry with dicarboxylic acids or dicarboxylic acid anhydrides of the type exemplified above. Polyether polyols which are suitable for this purpose include, for example the addition products of alkylene oxides, for example ethylene oxide and/or propylene oxides, to suitable starting molecules for example, water, ethylene glycol, propylene glycol, trimethylolpropane and/or glycerin.

In principle, any reaction products (which correspond to the above definition and contain free carboxylic groups) prepared by reacting dicarboxylic acids or dicarboxylic acid anhydrides of the exemplified type with the compounds known from polyurethane chemistry which have isocyanate-reactive groups, i.e. in particular hydroxyl groups or amino groups, may be used as component (a). For example, the derivatives of previously produced polyester polyols, polycarbonate diols, polycaprolactone diols, polyacetal diols and polyester amines or polyamides containing amino groups are to be included with these reaction products.

The preliminary products containing hydroxyl or amino groups are converted into the corresponding compounds containing terminal carboxyl groups by a reaction with dicarboxylic acids or dicarboxylic acid anhydrides, generally within a temperature range of from about 80° to 150° C. The exemplified dicarboxylic acid anhydrides are preferably used for the modification reaction. This reaction may be catalyzed with bases or tertiary amines, if required.

It is also possible to use compounds which contain ionic groups, in particular sulphonate groups, and which have terminal carboxyl groups as component (a). Compounds of this type may be obtained, for example by reacting the sulphonate diols described in U.S. Pat. No. 4,108,814 with dicarboxylic acid anhydrides of the exemplified type. It is also possible to use nonionically, hydrophilically-modified compounds containing terminal carboxyl groups as component (a), as they may be obtained, for example by reacting the exemplified dicarboxylic acid anhydrides with diols which have side chains and contain ethylene oxide units of the type mentioned in U.S. Pat. Nos. 3,905,929 and 4,190,566.

Such ionically or nonionically, hydrophilically-modified compounds are simultaneously used in particular for the production of aqueous dispersions of the products according to the present invention. In principle, it is also possible simultaneously to use the exemplified hydrophilic components containing hydroxyl groups which are not modified with dicarboxylic acid anhydrides for the hydrophilic modification of the products according to the present process, provided that the total content in component (a) of hydroxyl groups corresponds to the above-mentioned definition.

Compounds suitable as component (b) are nonaromatic polyisocyanates, having at least one cyclohexane ring and containing exclusively aliphatically- and/or cycloaliphatically-bound isocyanate groups. Diisocyanates containing at least one cycloaliphatically-bound isocyanate group are preferably used, and diisocyanates containing two cycloaliphatically-bound isocyanate groups are more preferably used.

For example, the following polyisocyanates are suitable as component (b): perhydrogenated xylylene diisocyanates, diisocyanatomethyl-tricyclodecanes which may be present as isomer mixtures, 1-isocyanato-3,3,5-trimethyl-5-isocyanatomethyl-cyclohexane (IPDI), 4,4'-diisocyanato-dicyclohexyl-methane, 4,4'-diisocyanato-dicyclohexyl-propane (2,2), or the phosgenation products of perhydrogenated aniline/formaldehyde condensates which are present as isomer or homologue mixtures. Polyisocyanates which contain biuret or isocyanurate groups and are based on the simple aliphatic or cycloaliphatic diisocyanates exemplified may also be used.

Polyamines containing at least two primary and/or secondary amino groups, preferably diamines and/or hydrazines containing two primary and/or secondary amino groups, are particularly included as component (d), i.e. as chain-lengthening agents, in addition to water, when the present process is being carried out.

Compounds suitable as component (d) particularly include those corresponding to the following general formula:

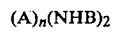

wherein
A represents a saturated aliphatic hydrocarbon radical having from 2 to 12, preferably from 2 to 6 carbon atoms, a saturated cycloaliphatic hydrocarbon radical having from 4 to 15, preferably from 6 to 10, carbon atoms, an aromatic hydrocarbon radical having from 6 to 15, preferably from 6 to 13, carbon atoms or an araliphatic hydrocarbon radical having from 7 to 13 carbon atoms, at least two carbon atoms being positioned between the two amino groups;

B represents hydrogen or an alkyl radical having from 1 to 18 carbon atoms, preferably hydrogen; and n represents 0 or 1.

The following are included as examples suitable for component (d): ethylene diamine, 1,2-propylene diamine, 1,3-propylene diamine, hexamethylene diamine, 1-amino-3,3,5-trimethyl-5-aminomethyl-cyclohexane (IPDA), 1,4-diaminocyclohexane, 4,4'-diamino-dicyclohexylmethane, 2,4- and 2,6-toluylene diamine and mixtures thereof or 4,4'-diaminodiphenyl-methane, or mixtures of such amines; as well as N-methyl-diethylene triamine, hydrazine, methyl hydrazine, dodecyl hydrazine, N,N'-dimethyl hydrazine or the hydrates of such hydrazines.

Diamines which contain ionic centers, for example the N-(ω-amino-alkane)-ω'-amino alkane sulphonic acid salts which are described in German Offenlegungsschrift No. 2,035,732 may particularly also be used as component (d) in the production of aqueous dispersions of plastics based on polyisocyanates according to the present invention.

During the production of aqueous dispersions of plastics based on the polyisocyanates according to the present process, it is also often appropriate to use diamines or hydrazines containing at least one reversibly blocked amino group as components (d). These are compounds which are selected from ketimines, ketazines, oxazolidines, aldazines, aldimines and carbonates. From compounds of this type are produced the amines or hydrazines on which they are based under the hydrolytic influence of water. The production of aqueous dispersions of plastics based on polyisocyanates with the use of such blocked chain-lengthening agents is described, for example, in U.S. Pat. Nos. 4,192,937; 4,269,748 and 4,292,266 or in German Offenlegungsschrift No. 2,725,589. The ketamines described in German Offenlegungsschrift No. 2,725,589 and the azines described in U.S. Pat. No. 4,269,748 are particularly preferred as component (d) having at least partly blocked amino groups. When carrying out the present process using these particular chain-lengthening agents according to the methods disclosed in the above-mentioned publications, it is only essential for at least 50%, preferably for more than about 85%, of the amino groups present in the amine or hydrazine component to be present in a blocked form and accordingly, for the amines to contain on statistical average a maximum of 1 mol, preferably a maximum of about 0.30 mol, of free amino groups per mol of polyamine, preferably diamine.

Examples of blocked chain-lengthening agents of the type mentioned include acetone hydrazone, acetonazine, the bis-ketimine of IPDA and acetone, the homologous compounds based on methylethyl ketone or on methylisobutyl ketone or acetaldazine. The bis-ketimines of IPDI mentioned, and acetone hydrazone or acetonazine are preferred as component (d) having blocked amino groups.

In a first stage of the present process, a prepolymer containing isocyanate groups is produced from component (a) and component (b). During this reaction, the reaction components are generally used in quantities corresponding to an equivalent ratio of isocyanate groups to isocyanate-reactive groups (in particular carboxyl groups) of from about 1.2:1 to 3:1, preferably from about 1.4:1 to 3:1.

The reaction components are preferably reacted in substance, such that they are mixed together at from about 20° to 120° C. and are heated as quickly as possible to a temperature of from about 130° to 200° C., preferably from about 140° to 170° C., and are reacted at this temperature until the end of the release of carbon dioxide. The reaction may be carried out under an inert gas, such as nitrogen, and/or in the presence of a catalyst.

Examples of suitable catalysts particularly include tertiary amines, alcoholates or phenolates and organometallic compounds, for example lithium methylate, sodium methylate, potassium methylate, lithium-t-butylate, sodium-t-butylate, potassium-t-butylate, sodium phenolate, lithium acetate, sodium acetate, potassium acetate, the alkali metal alcoholates of 2-ethyl-hexanol and the alkali metal salts of 2-ethyl-caproic acid. The following are also mentioned: lead octoate, tin octoate, nickel oleate, nickel acetylacetonate, dibutyl-tin-dilaurate, triethylamine or triethylenediamine.

The catalysts may optionally be deactivated at the end of the reaction. For this purpose, the reaction products are mixed with from about 100 to 1000 ppm of neutralizing, acetylating or alkylating substances. Substances of this type include for example: hydrogen chloride, benzoyl chloride, ethyl iodide, dimethyl sulphate, sulphur or complex-formers.

In principle, the NCO prepolymers may also be produced in the presence of inert, high-boiling solvents. Examples of such solvents include sulpholane, dimethyl formamide, N-methyl-pyrrolidone, diphenyl ether or diphenyl sulphone. Following production and before further reaction thereof, the NCO prepolymers may be diluted with inert solvents, the boiling point of which is now uncritical. Solvents suitable for this purpose particularly include acetone, methylethyl ketone, tetrahydrofuran, dioxane, ethyl acetate or toluene, in addition to the solvents mentioned above.

In one embodiment of the present process, in particular during the production of aqueous dispersions of plastics based on polyisocyanates according to the present process, it may be appropriate simultaneously to use an additional starting component (c) in the production of the NCO prepolymers. This particular component (c) which is preferably used in admixture with component (a) is a reaction component which is monofunctional for the purposes of the isocyanate-addition reaction and has a molecular weight of from about 500 to 4000, preferably from about 800 to 2500. The isocyanate-reactive groups of component (c) are generally hydroxyl groups or preferably carboxyl groups. Preferred compounds for component (c) are monohydric polyether alcohols having ethylene oxide units and optionally also propylene oxide units or the reaction products thereof, containing carboxyl groups, with dicarboxylic acid anhydrides of the type exemplified above. Component (c) generally contains at least about 50%, preferably at least about 80%, by weight, of structural ethylene oxide units. They are produced by alkoxylation, preferably ethoxylation, of monofunctional starting molecules, for example ethanol or n-butanol, after which the above-mentioned modification reaction with dicarboxylic acid anhydride may optionally be carried out.

If such component (c) is simultaneously used in the production of the NCO prepolymers, the quantity thereof, based on the total of components (a) and (b), is a maximum of about 15%, preferably a maximum of about 10%, by weight. The use of component (c) containing hydroxyl groups is particularly possible, provided that the total quantity of hydroxyl groups present in the mixture of components (a) and (c) amounts to a maximum of about 10% preferably a maximum of about 5%, of all the isocyanate-reactive groups which are present in this mixture. When component (c) is simultaneously used in the production of the NCO prepolymers, the quantity of polyisocyanate (component (b)) must, of course, be increased accordingly, so that the above-mentioned conditions with respect to the equivalent ratio of isocyanate groups to isocyanate-reactive groups are still fulfilled. It may be appropriate to compensate for the chain-terminating effect of monofunctional component (c) by the simultaneous use of a corresponding quantity of at least trifunctional components (a) and/or (b) and/or (d).

The NCO prepolymers produced from components (a), (b) and optionally (c) are reacted with the chain lengthening agent (d) in the second stage of the present process.

Apart from the use of high excesses of water during the use thereof as a chain-lengthening agent in the production of aqueous dispersions of the polyisocyanate-based plastics, the chain-lengthening agents are generally used in quantities such that from about 0.5 to 1.5, preferably from about 0.7 to 1.1, in particular about 1, gram equivalent of amino groups of the chain-lengthening agent (d), which are optionally partly blocked in a reversible manner, are available per mol of isocyanate groups of the prepolymer. When water is used as a chain-lengthening agent in the production of non-dispersed polyisocyanate-based plastics, suitable quantities of water are used, and water may be considered as a difunctional chain-lengthening agent. During the production of aqueous dispersions of polyisocyanate-based plastics with the simultaneous use of water and amine or hydrazine chain-lengthening agents which are optionally partly blocked, the quantity of water is not considered in the calculation of the quantity of amine or hydrazine chain-lengthening agents.

If water is used as the chain-lengthening agent (d), an embodiment of the present process is also possible according to which the chain-lengthening reaction of the NCO prepolymer takes place under the influence of atmospheric moisture. According to this embodiment of the present process, the prepolymers containing NCO groups are processed as a moisture-hardenable one-component system, optionally after a "pre-lengthening" operation with less than stoichiometric quantities of amine or hydrazine chain-lengthening agents having exclusively free amino groups. For example, in this procedure, the chain-lengthening reaction is carried out after processing the NCO prepolymers (which are optionally pre-lengthened) as coating agents for substrates which cure under the influence of atmospheric moisture to produce thermostable coatings. In this embodiment of the present process, the NCO prepolymers which are optionally pre-lengthened may, of course, be provided with auxiliaries and additives which are conventional in coating technology, for example, lacquer solvents, pigments, flow auxiliaries and fillers or the like, before they are processed.

During the reaction of the NCO prepolymers with water and/or with amine or hydrazine chain-lengthening agents of the exemplified type within the above-mentioned ranges, in particular during the stoichiometric reaction of the NCO prepolymers with chain-lengthening agent (d), valuable polyisocyanate-based plastics are produced which are substantially free of urethane groups, and the mechanical properties of which may be varied within wide ranges by a suitable choice of the type and particularly the functionality of the starting materials. The reaction of the NCO prepolymers with the chain-lengthening agents may be carried out in solvent-free manner or in the presence of solvents of the type exemplified above. Thus, for example, the process according to the present invention is particularly suitable for the production of physically drying lacquer solutions, in which case NCO prepolymers which are substantially produced from linear starting materials (a) and (b), and into which small quantities of monofunctional isocyanates, for example stearyl isocyanate, are optionally incorporated for the purpose of controlling the chain-termination are reacted in lacquer solvents of the type exemplified above with preferably stoichiometric quantities of chain-lengthening agent (d).

Aqueous dispersions of the polyisocyanate-based plastics are produced according to a preferred embodiment of the present process. For this purpose, components (a), (c) and/or (d) of the exemplified type containing ionic centers and/or nonionic, hydrophilic groups are preferably simultaneously used in a quantity ensuring the dispersibility of the isocyanate-polyaddition products while the present process is being carried out. Moreover, either the chain-lengthening reaction of the NCO prepolymers takes place in an aqueous medium, i.e., in a high excess of water, based on the isocyanate groups of the prepolymer, or the polyisocyanate-based plastics which are produced in the absence of excess quantities of water are converted into an aqueous dispersion following production thereof.

During the production of aqueous dispersions, the hydrophilic components mentioned are generally used in a quantity such that the polyisocyanate-based plastics which are finally dispersed in water contain up to about 45 milliequivalents of ionic centers, in particular of sulphonate groups, per 100 g of solids and/or contain up to about 30%, preferably to about 20%, by weight of ethylene oxide units positioned in polyether chains, one of these characteristic numbers having, of course, to be other than 0, so that there is a quantity of hydrophilic centers ensuring the dispersibility of the polyisocyanate-based plastics. It is largely unimportant whether the hydrophilic centers have been incorporated into the products of the process via component (a), (c) or (d) or via several of these components. When producing the polyisocyanate-based plastics in the absence of dispersing water, the present process is preferably carried out in the presence of a hydrophilic solvent, for example N-methyl-pyrrolidone, dioxane or acetone, after which the aqueous dispersion is produced by mixing the thus-obtained solution of the products of the present process with water, optionally removing any readily volatile solvents, such as acetone, by distillation after mixing with water. It is also possible during the production of aqueous dispersions to mix, for example, a hydrophobic NCO prepolymer of the exemplified type with a hydrophilically-modified NCO prepolymer of the exemplified type, so that the total quantity of hydrophilic groups in the mixture corresponds to the above-mentioned quantities, and it is then possible to convert the mixture into the end product by reaction with component (d).

According to one preferred embodiment for the production of aqueous dispersions of the products according to the present process, the chain-lengthening reaction of the optionally hydrophilically-modified NCO prepolymer produced from components (a), (b) and optionally (c) takes place by the reaction thereof with aqueous solutions of diamines of the types exemplified above, optionally containing ionic centers, or with hydrazines of the type exemplified above, and the NCO prepolymers are combined with the aqueous solutions of the chain-lengthening agents (d) either as a melt or in the form of solutions in solvents of the last exemplified type.

According to another preferred embodiment for the production of aqueous dispersions of the products according to the present invention, the hydrophilically modified NCO-prepolymers produced from components (a), (b) and optionally (c) are mixed with at least partly blocked diamines or hydrazines in the absence of water analogously to the methods disclosed in German Offenlegungsschrift No. 2,725,589 or in U.S. Pat. Nos. 4,269,748, 4,192,937 or 4,292,226 and the thus-obtained mixture is then mixed with water.

It is basically also possible simultaneously to use external emulsifiers, for example alkali metal salts of long-chain fatty acids or long-chain alkane sulphonic acids or ethoxylated alkyl benzenes having an average molecular weight of from about 300 to 3000, during the production of aqueous dispersions of the products according to the present invention, instead of or simultaneously with the incorporated hydrophilic centers. In this method, these external emulsifiers are appropriately incorporated into the NCO prepolymers before the chain-lengthening process thereof. However, the use of such external emulsifiers is a less preferred embodiment when compared to the use of incorporated hydrophilic centers.

In the production of aqueous dispersions of the products according to the present process, the quantity of water is generally calculated such that dispersions containing from about 10 to 60%, preferably from about 20 to 50%, by weight solids are produced. The thus-obtained dispersions may be used with conventional auxiliaries and additives and may be used in all conventional areas for aqueous polyurethane dispersions.

In all the embodiments of the present process, the chain-lengthening reaction preferably takes place at room temperature or at moderately elevated temperature, i.e., in a temperature range of from about 15° to 60° C.

The invention is further illustrated, but is not intended to be limited by the following examples in which all parts and percentages are by weight unless otherwise specified.

EXAMPLES

The following components (a) were used in the Examples:
1. Polyester A Produced from hexane diol, neopentyl glycol and adipic acid in a mol ratio of 4.4:2.4:7.8, having a molecular weight of 1598, an acid number of 69.5 and a viscosity at 75° C. of 730 mPa.s.
2. Polyester B Produced from 1,4-butane diol, 1,6-hexane diol and adipic acid, having a molecular weight of 960, an acid number of 114.1 and a viscosity at 75° C. of 320 mPa.s.
3. Polyether A Produced from polypropylene glycol (molecular weight 2000) and succinic acid anhydride in a mol ratio of 1:2. The acid number is 50.4 and the molecular weight is 2222.
4. Polyether B Produced from polypropylene glycol (molecular weight 1000) and succinic acid anhydride in a mol ratio of 1:2. The acid number is 90 and the molecular weight is 1244.

The following polyether was used as component (c):
Polyether C Produced from 1 mol of monofunctional polyethylene oxide polyether started on n-butanol having a molecular weight of 1145 and 1 mol of succinic acid anhydride at 120° C. over a period of 5 hours with subsequent vacuum degassing. Content of ethylene oxide: 86.1%.

EXAMPLE 1

200 g (0.13 mols) of Polyester A were dehydrated for 30 minutes at from 100° to 110° C. and under a pressure of 18 mbar in a one liter reaction vessel. After cooling to 80° C., 81.74 g (0.312 mols) of 4,4'-diisocyanatodicyclohexyl methane (Desmodur W, available from Bayer AG, Leverkusen) were added under nitrogen and the reaction vessel was immersed, with stirring, into an oil bath which had been pre-heated to 160° C. When an internal temperature of about 140° C. was reached, $CO_2$ started to evolve vigorously. The volume of gas was measured by a gas meter. After a total of 4.5 hours, 5.82 l (0.26 mols) of $CO_2$ had evolved, corresponding to 100% of the theoretical yield. The mixture was cooled to room temperature and a clear, highly viscous melt ($\eta 23°$ C.=320,000 mPa.s) was obtained containing 5.3% of NCO (calculated 5.65%). The product was readily soluble in esters, ethers and ketones. After being stored for 12 weeks at room temperature, the NCO content had fallen slightly to 5.2%. The NCO prepolymer was suitable for the production of coatings which harden under the influence of atmospheric moisture. For this purpose, the NCO prepolymer or the solution thereof is preferably mixed with a catalyst accelerating the chain-lengthening reaction with water, for example dibutyl tin dilaurate, and is applied to the substrate to be coated.

EXAMPLE 2

Example 1 was repeated under identical conditions, but 0.2 g (1000 ppm) of sodium methylate were added to the reaction mixture. In this case, the theoretical volume of $CO_2$ was obtained after 85 minutes. The NCO content amounts to 5.1% and the viscosity $\eta 25°$ C. was 250,000 mPa.s. Thus, the rate of the reaction was accelerated by a factor >3 by 100 ppm of sodium methylate. The product had identical solution properties and, like the product according to Example 1, is suitable for the production of coatings which are hardenable under the influence of atmospheric moisture.

EXAMPLE 3

400 g (0.26 mols) of Polyester A were reacted with 152.7 g (0.583 mols) of 4,4'-diisocyanatodicyclohexylmethane (Desmodur W) in the presence of 500 ppm of sodium methylate (based on the polyester) under the reaction conditions described in Example 1. The theoretical volume of $CO_2$ (11.6 l) had evolved after 90 minutes and the NCO content was 4.6% (calculated 5.1%). The clear, pale yellow melt was dissolved 50% in acetone. A water-dilute, clear solution was obtained which, after adding dibutyl tin dilaurate, may be used for the production of coatings which harden under the influence of atmospheric moisture.

EXAMPLE 4

An NCO prepolymer which is free from urethane groups was produced in a completely analogous manner to Example 3 from the following:
200 g (0.125 mols) of Polyester A
65.5 g (0.250 mols) of 4,4'-diisocyanatodicyclohexyl methane (Desmodur W)
250 ppm of lead octoate.

After 2 hours at 160° C., the mixture was dissolved 70% in dried tetrahydrofuran. NCO content: calculated 4.12%, observed 4.13% (based on solids). The clear solution was stable in storage for at least 3 months and may be used just like the solution of the previous examples for the production of coatings which harden under the influence of atmospheric moisture.

EXAMPLE 5

200 g of Polyester A (0.13 mols) were reacted with 69.3 g (0.312 mols) of isophorone diisocyanate in the presence of 1000 ppm of sodium methylate in a completely analogous manner to Example 1. 100% of the theoretical yield of $CO_2$ was produced after 90 minutes. The clear, yellowish melt was cooled ($\eta 23°$ C.=410,000 mPa.s) and the NCO content was determined as 4.5%. The NCO prepolymer may also be used as a binder for coating agents which harden under the influence of atmospheric moisture.

EXAMPLE 6 (COMPARATIVE EXAMPLE)

The following Comparative Examples 6a, 6b, and 6c demonstrate that aromatic diisocyanates are unsuitable according to the present invention due to undesirable secondary reactions.

(a) 200 g of Polyester A were reacted with 51 g (0.293 mols) of 2,4-diisocyanato toluene under the reaction conditions of Example 1. After a total of 3.5 hours, only 80% of the theoretical yield (4.7 l) of $CO_2$ was released, but the product was completely cross-linked. It was insoluble in acetone, tetrahydrofuran and ethyl acetate.

(b) When this experiment was repeated in the presence of 1000 ppm of sodium methylate, the mixture cross-linked after 20 minutes, and only 67% of the theoretical yield (3.9 l) of $CO_2$ was measured. Since catalysts did not produce the desired result, the diisocyanate was deactivated in Example 6c.

(c) Comparative Example 6a was repeated, but diisocyanato toluene deactivated with 175 ppm of hydrogen chloride was used. After 2.5 hours, only 65% of the theoretical yield (3.8 l) of $CO_2$ was obtained, and the product was already full of gel particles and was insoluble in acetone. NCO content 5.6%, calculated 5.7%.

(d) Comparative Example 6a was repeated with the only exception the reaction temperature being lowered to 120° C. rather than 160° C. After 3.5 hours only 4.0 l of $CO_2$ (71%) were released; at this point the material gelled and was insoluble in acetone. Thus the lower temperature did neither increase the evolution of $CO_2$ nor decrease the amount of cross-linking.

EXAMPLE 7 (COMPARATIVE EXAMPLE)

The following Examples 7a and 7b prove the special position of cycloaliphatic diisocyanates, because they show that 1,6-diisocyanato-hexane is also unsuitable for the process according to the present invention.

(a) When 800 g (0.52 mols) of Polyester A were reacted with 156.3 g (0.93 mols) of 1,6-diisocyanato-hexane, then only 70% of the theoretical yield (16 l) of $CO_2$ was obtained after 35 minutes at from 140° to 160° C., and the product was already completely cross-linked and had become insoluble.

(b) When this experiment was repeated using 200 g (0.13 mols) of Polyester A and 49.14 g (0.293 mols) of 1,6-diisocyanato-hexane in the presence of 1000 ppm of p-toluene sulphonic acid methyl ester (deactivation), a completely cross-linked product was obtained after 100 minutes, although only 74% of the theoretical yield (4.3 l) of $CO_2$ evolved. The product was insoluble in tetrahydrofuran and in acetone.

EXAMPLES 8 TO 16

The following examples show the multiplicity of possible catalysts.

In each case, 200 g (0.125 mols) of dehydrated Polyester A were mixed with 62.4 g (0.28 mols) of IPDI and with the respective catalyst at about 70° C. and were lowered into a bath which had been pre-heated to 160° C. At the end of the $CO_2$ evolution, the gas volume was measured and the viscous melt was cooled to about 80° C. and was dissolved 70% in an organic solvent. The NCO content was determined beforehand. The results are provided in Table I.

TABLE I

| Example | Catalyst | % of the theoretical yield of $CO_2$ | Time [h] | NCO [%] | 70% solution |
|---|---|---|---|---|---|
| 8 | Sodium methylate[1] | 100 | 1.0 | 4.6 | optically clear (Acetone) |
| 9 | Sodium phenolate[1] | 95 | 2.2 | 5.1 | optically clear (Acetone) |
| 10 | Dibutyl tin dilaurate[1] | 98 | 2.2 | 5.0 | optically clear (Acetone) |
| 11 | Lithium metal[2] | 100 | 2.5 | 5.3 | optically clear (Acetone) |
| 12 | Lithium methylate[1] | 95 | 1.5 | 4.6 | optically clear (Acetone) |
| 13 | Lithium-t-butylate[1] | 100 | 2.3 | 4.6 | optically clear (Ethyl acetate) |
| 14 | Lead octoate[1] | 99 | 2.2 | 4.9 | optically clear (Tetrahydrofuran) |
| 15 | Nickel oleate[1] | 97 | 1.8 | 4.4 | optically clear (Methyl-ethyl-ketone) |
| 16 | — | 95 | 6.5 | 5.1 | optically clear (Acetone) |

[1] 250 ppm, based on the total mixture
[2] 500 ppm, based on the total mixture

EXAMPLES 17–18

The process was carried out in a completely analogous manner to Example 1.

| EXAMPLE | Polyester A | Catalyst[1] | Diiso[2] cyanate | $CO_2$ % of theoret. yield | NCO [%] | Time [h] |
|---|---|---|---|---|---|---|
| 17 | 200 g | Tin-II-octoate | 73.6 g | 100 | 4.66 | 1.5 |
| 18 | 200 g | "DABCO" | 73.6 g | 98 | 4.75 | 1.5 |

[1] 250 ppm, based on the total mixture
[2] 4,4'-diisocyanatodicyclohexyl methane

EXAMPLE 19

400 g (0.322 mols) of Polyether B were dehydrated and mixed with 1000 ppm of 4-methyl-2,6-di-tert.-butylphenol and 250 ppm of sodium methylate. 161 g (0.725 mols) of isophorone diisocyanate was added at 80° C. and the mixture was rapidly heated to 140° C. Vigorous $CO_2$ evolution was observed upon reaching a temperature of 120° C. The evolution (100% of the theoretical yield) was complete after 3 hours. The NCO content was 5.4%. The product was clearly soluble in acetone and is suitable for the production of coatings which harden under the influence of atmospheric moisture.

EXAMPLE 20

Example 19 was repeated, but in this case with 200 g (0.090 mols) of Polyether A and 45.1 g (0.203 mols) of isophorone diisocyanate. The $CO_2$ evolution had finished after 1 hour at an internal temperature of 135° C. The NCO content was 3.65%. The product was clearly soluble in acetone, ethyl acetate, dioxane, tetrahydrofuran and methyethyl ketone and is suitable for the production of coatings which harden under the influence of atmospheric moisture.

EXAMPLE 21

500 g of a 50% solution of an NCO prepolymer in acetone prepared according to Example 3 were diluted with a further 325 ml of acetone and were mixed at 50° C. with a mixture of 2.95 g (0.059 mols) of hydrazine hydrate and 13.5 g (0.036 mols) of a 51% aqueous solution of the sodium salt of N-aminoethyl-2,2-aminoethane sulphonic acid in 50 g of water.

After 5 minutes, the mixture was dispersed by adding dropwise 375 ml of deionized water and the acetone was distilled off under a water jet vacuum.

A finely divided aqueous polyester-polyamide-polyurea dispersion was obtained which was stable in storage for more than 4 months.

| Solids content | 40.1% |
|---|---|
| pH | 6.8 |
| % $SO_3^\ominus$ | 1.1 |
| Particle size | 303 nm (Nanometer) |
| Outflow viscosity | 11.4 sec FB, Nozzle 4. |

A glass plate was coated with the dispersion in a wet film thickness of 0.2 mm. The coating was dried at room temperature for 8 hours and was then heated at 120° C. for 20 minutes. In this manner, an optically clear, flexible, hard-elastic film was obtained. The dispersion is particularly suitable for coating textiles or for finishing leather.

EXAMPLE 22

407 g of a 50% solution of the NCO prepolymer prepared according to Example 5 were diluted with 430 ml of acetone, as described in Example 21, and then chain-lengthened with a solution of 2.6 g of hydrazine hydrate (0.051 mols) and 15.74 g (0.042 mols) of the diaminosulphonate mentioned in Example 21, in 50 ml of water. The thus-obtained solution was then dispersed in 340 g of salt-free water. After distilling off the acetone, a finely-divided aqueous dispersion of a polyester-polyurea-polyamide was obtained which was stable in storage for more than 4 months.

| Solids content | 43.5% |
|---|---|
| pH | 6.9 |
| % $SO_3^\ominus$ | 1.3 |
| Particle size | 195 nm |
| Outflow viscosity | 12.1 sec FB, Nozzle 4. |

The dispersion was stable to centrifugation (30 mins/3000 r.p.m.). An optically clear, highly flexible, elastic film was obtained on a glass plate which was coated with the dispersion according to Example 21, after drying in the air and after being subsequently heated at 120° C. for 20 minutes. The dispersion is suitable for coating and laminating textiles, leather or glass, for example.

EXAMPLE 23

Example 3 was repeated and the clear melt was dissolved 50% in toluene/THF (in a ratio of 1:1.33).

A mixture of 208.5 g of the above-mentioned prepolymer solution with 2.6 g of stearyl isocyanate was added dropwise to a solution of 10.05 g of IPDA (0.0591 mols) in 157 g of isopropanol and 94 g of toluene over a period of about 2 hours.

A physically drying, optically clear, storage stable polyester-polyurea-polyamide lacquer was obtained.

The solids content was 24.84% and the viscosity at 25° C. was 18,000 mPa.s

The material is suitable for finishing textiles and leather.

EXAMPLE 24

200 g (0.208 mols) of Polyester B were dehydrated and mixed with 103.9 g (0.468 mols) of IPDI and 250 ppm of lead octoate and were reacted for 2 hours at 160° C. bath temperature. The melt was dissolved 70% in acetone and the solution was clear and thinly liquid.

The solution was stirred with a solution of 26.2 g of IPDA in 156 g of toluene and 156 g of isopropanol. The NCO content of the solution of the pre-lengthened NCO prepolymer was then 1.5%. Glass plates were then coated with the solution. After being stored for 2 days at room temperature in the air, optically clear, tough elastic films were obtained which had an excellent adhesion to glass.

When, instead of IPDA, a stoichiometrically equivalent quantity of hydrazine hydrate (7.71 g) was used, clear films of a similar elasticity were obtained.

25 g of above solution (70° in acetone) was mixed with 5 g of toluene and 3 drops of catalyst Formrez-®UL 1 (Witco) and coated on a clean glass plate using a 10 mil drawdown bar.

After 2 days at ambient temperature a completely clear, tough and elastic moisture cured film was obtained.

EXAMPLE 25

Part 1

600 g (0.407 mols) of Polyester A were dehydrated for 30 minutes at from 110° to 120° C. in a water jet vacuum. 240 g (0.916 mols) of 4,4'-diisocyanatodicyclohexyl methane (Desmodur W) were added at 80° C. and the mixture was catalyzed with 75 mg (125 ppm) of sodium methylate. The theoretical volume of $CO_2$ (18.23 l) had evolved within 1 hour at 160° C. The prepolymer was dissolved 80% in dioxane. The NCO content of the solution was 4.06% (theoretically: 4.26%).

Part 2

304 g of sulphonate diol (0.5 mols) and 100 g (1 mol) of succinic acid anhydride were mixed with 0.3 g of lithium-t-butylate and were stirred for 4 hours at from 120° to 125° C. The anhydride band had disappeared in the IR spectrum.

The sulphonate diol was a propoxylated adduct of 2-butene diol-1,4 and $NaHSO_3$ having a molecular weight of 425. The product was used as a 70% clear solution in toluene, the toluene being removed by distillation under vacuum after the reaction with the anhydride.

Part 3

100 g of Polyether C (0.08 mols) were thoroughly mixed with 200 g (0.245 mols) of the product from Part 2.

188.45 g (0.7193 mols) of 4,4'-diisocyanatodicyclohexyl methane (Desmodur W) were added at 75° C. The reaction was completed (theoretical amount of $CO_2$) after 2 hours at from 120° to 125° C. and the mixture was dissolved 80% of dioxane. The NCO content of the solution was 6.56% (theoretically: 6.54%). The ethylene oxide content of the prepolymer was 29% and the sulphonate content was 6.6%.

Part 4

800 g of the prepolymer from Part 1 were thoroughly mixed with 176.6 g of the prepolymer from Part 3 at from 65° to 70° C. and were mixed with 40.9 g (0.365 mols) of acetonazine at 70° C. After 8 minutes, the mixture was dispersed with thorough stirring with a mixture of 1171 ml of water, 6.6 g of diethylene triamine and 3.8 g of ethoxylated nonylphenol ("NP 30", BAYER AG). The mixture was then stirred for 4 hours at from 60° to 70° C., cooled to room temperature and a little coarsely-divided matter was filtered off. (400μ filter).

| Data of the dispersion | |
| --- | --- |
| Solids | 35% |
| Content of ethylene oxide | 3.2% |
| Sulphonate content | 0.73% |
| pH | 6.0. |

Films were produced on glass plates and on aluminum film as described above and were dried for 5 hours at 120° C.

A hard-elastic, slightly opaque film was obtained having a Shore A hardness of 71.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of plastics based on an isocyanate-polyaddition product which may optionally contain ionic groups with the provision that the ionic groups, if present, are exclusively sulfonate groups which comprises
   (1) forming an isocyanate group-containing prepolymer from
      (a) a compound which has a molecular weight of from 146 to about 10,000, is substantially free from hydroxyl groups, contains at least two terminal carboxyl groups and optionally contains ether and/or ester groups,
      (b) excess quantities of an organic nonaromatic polyisocyanate which has at least one cyclohexane ring and exclusively contains aliphatically- and/or cycloaliphatically-bound isocyanate groups and
      (c) up to 10 equivalent percent, based on the isocyanate-reactive groups in component (a), of a compound which is monofunctional for the purpose of the isocyanate-addition reaction and
   (2) reacting the product of step (1) with
      (d) a chain-lengthening agent comprising water, a polyamine containing at least two primary and/or secondary amino groups or hydrazine or a derivative thereof containing at least two primary and/or secondary amino groups.

2. The process of claim 1 wherein the polyisocyanate of component (1)(b) contains at least one cycloaliphatically-bound isocyanate group.

3. The process of claim 1 wherein said plastic is an aqueous dispersion of an isocyanate-polyaddition product.

4. The process of claim 3 wherein component (1)(a) comprises a compound containing ionic and/or nonionic hydrophilic groups; component (1)(c) comprises a compound containing nonionic hydrophilic groups; and/or component (2)(d) comprises a polyamine containing ionic groups, said compounds being used in a quantity which ensures the dispersibility of the polyaddition products in water.

5. The process of claim 4 wherein step (2) is conducted in the aqueous phase or step (2) is conducted in the absence of water and subsequently the polyaddition products are dispersed in water.

6. The process of claim 4 wherein component (2)(d) comprises a diprimary diamine and/or hydrazine containing at least one blocked amino group selected from the group consisting of ketimines, ketazines, oxazoladines, aldazines, aldimines and carbonates and wherein step (2) is conducted by mixing the reaction product of step (1) with component (2)(d) in the absence of water and subsequently mixing the mixture with water.

7. The process of claim 1 which comprises conducting step (1) at an equivalent ratio between isocyanate groups and isocyanate-reactive groups of from about 1.4:1 to 3:1 and at a temperature of from about 130° to 200° C.

8. The process of claim 2 which comprises conducting step (1) at an equivalent ratio between isocyanate groups and isocyanate-reactive groups of from about 1.4:1 to 3:1 and at a temperature of from about 130° to 200° C.

9. The process of claim 5 which comprises conducting step (1) at an equivalent ratio between isocyanate groups and isocyanate-reactive groups of from about 1.4:1 to 3:1 and at a temperature of from about 130° to 200° C.

10. The process of claim 6 which comprises conducting step (1) at an equivalent ratio between isocyanate groups and isocyanate-reactive groups of from about 1.4:1 to 3:1 and at a temperature of from about 130° to 200° C.

11. The product produced in accordance with the process of claim 8.

12. The product produced in accordance with the process of claim 9.

13. The product produced in accordance with the process of claim 10.

* * * * *